United States Patent
Tarr et al.

(10) Patent No.: US 9,145,976 B2
(45) Date of Patent: Sep. 29, 2015

(54) VALVE ASSEMBLY FOR USE WITH A WASHING APPLIANCE

(75) Inventors: Ronald Scott Tarr, Louisville, KY (US); Eric K. Watson, Crestwood, KY (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 12/952,971

(22) Filed: Nov. 23, 2010

(65) Prior Publication Data

US 2012/0060876 A1     Mar. 15, 2012

(51) Int. Cl.
| | |
|---|---|
| *A47L 15/00* | (2006.01) |
| *A47L 15/42* | (2006.01) |
| *D06F 33/02* | (2006.01) |
| *G05D 7/06* | (2006.01) |
| *F16K 31/06* | (2006.01) |
| *F16K 37/00* | (2006.01) |

(52) U.S. Cl.
CPC ......... *F16K 31/0675* (2013.01); *A47L 15/0023* (2013.01); *A47L 15/4217* (2013.01); *F16K 37/005* (2013.01); *G05D 7/0635* (2013.01); *A47L 2401/06* (2013.01); *A47L 2401/12* (2013.01); *A47L 2501/01* (2013.01); *D06F 33/02* (2013.01); *D06F 2202/04* (2013.01); *D06F 2202/08* (2013.01); *D06F 2204/086* (2013.01); *D06F 2204/088* (2013.01); *D06F 2212/02* (2013.01); *Y10T 137/7737* (2015.04); *Y10T 137/7761* (2015.04)

(58) Field of Classification Search
CPC ............ D06F 2202/04; D06F 2202/08; D06F 2204/086; D06F 2204/088; D06F 2212/02; D06F 33/02; A47L 15/0023; A47L 15/4217; A47L 2401/06; A47L 2401/12; A47L 2501/01; F16K 31/0675; F16K 37/005; G05D 7/0635; Y10T 137/7737; Y10T 137/7761
USPC ........... 134/94.1, 186, 198, 56 R, 56 D, 57 D, 134/58 D; 68/207, 12.19
See application file for complete search history.

(56) References Cited

U.S. PATENT DOCUMENTS

| | | | | |
|---|---|---|---|---|
| 3,395,332 | A | * | 7/1968 | Altfather ....................... 323/284 |
| 4,031,911 | A | * | 6/1977 | Frazar ............................... 137/3 |
| 4,417,312 | A | * | 11/1983 | Cronin et al. ................. 700/282 |
| 4,528,709 | A | * | 7/1985 | Getz et al. ......................... 8/158 |
| 4,589,435 | A | * | 5/1986 | Aldrich .......................... 137/102 |

(Continued)

FOREIGN PATENT DOCUMENTS

| | | | |
|---|---|---|---|
| DE | 29 38 536 | * | 4/1980 |
| JP | 07-265575 | * | 10/1995 |

(Continued)

*Primary Examiner* — Michael Barr
*Assistant Examiner* — Levon J Shahinian
(74) *Attorney, Agent, or Firm* — Dority & Manning, P.A.

(57) ABSTRACT

A valve assembly for use with a washing appliance having a main controller includes a valve that is moveable between a first position that prevents water from flowing through a supply line and a second position that allows water to flow through the supply line. A control assembly separate from the main controller is configured to control the valve to move between the first position and the second position. The control assembly includes a flow sensor configured to output a signal representing an amount of water flowing through the supply line and a control unit configured to control the valve assembly based on the output signal of the flow sensor.

13 Claims, 5 Drawing Sheets

(56) References Cited

U.S. PATENT DOCUMENTS

| | | | |
|---|---|---|---|
| 4,643,350 A * | 2/1987 | DeSchaaf et al. | 236/12.12 |
| 5,124,934 A * | 6/1992 | Kawamoto et al. | 700/282 |
| 5,139,044 A * | 8/1992 | Otten et al. | 137/80 |
| 5,934,302 A * | 8/1999 | Nemelka | 137/1 |
| 5,938,172 A * | 8/1999 | Ohtsuka et al. | 251/129.01 |
| 5,971,011 A | 10/1999 | Price | |
| 6,237,618 B1 | 5/2001 | Kushner | |
| 6,837,271 B1 * | 1/2005 | Saint | 137/624.12 |
| 6,887,318 B2 * | 5/2005 | Bashark | 134/18 |
| 7,813,101 B2 * | 10/2010 | Morikawa | 361/160 |
| 7,869,901 B2 * | 1/2011 | Johnson et al. | 700/240 |
| 2002/0189983 A1 * | 12/2002 | Guess et al. | 210/87 |
| 2007/0017551 A1 | 1/2007 | Hartogh | |
| 2007/0059839 A1 * | 3/2007 | Goza | 436/55 |
| 2009/0301576 A1 * | 12/2009 | Liu et al. | 137/468 |

FOREIGN PATENT DOCUMENTS

| | | | |
|---|---|---|---|
| JP | 2004-044831 | * | 2/2002 |
| JP | 2003-064736 | * | 3/2003 |
| KR | 2004011828 | * | 2/2004 |
| KR | 2004011830 | * | 2/2004 |
| KR | 2004014754 | * | 2/2004 |
| WO | 2006014891 A1 | | 2/2006 |

* cited by examiner

VALVE ASSEMBLY FOR USE WITH A WASHING APPLIANCE

BACKGROUND OF THE INVENTION

The embodiments described herein relate generally to valve assemblies and, more particularly, to a valve assembly for use with a washing appliance, such as a dishwasher.

In at least some known dishwashers, it is desirable to reduce water consumption to conserve energy and/or water. For known dishwashers, there is a minimum amount of water that enables the dishwasher to properly pump water to wash items within a tub of the dishwasher. Such an amount of water is referred to herein as "a minimum amount," which includes some variation from a calculated minimum amount of water that enables a dishwasher to function properly. Any amount of water that is more than the minimum amount of water is referred to herein as "extra water." When less water than the minimum amount of water is used, performance of the dishwasher may decrease and/or noise generated by the dishwasher may increase. Accordingly, a water supply valve of the dishwasher is controlled to provide at least the minimum amount of water to the tub.

At least some known dishwashers include water supply valves that are controlled to be open for a fixed, predetermined time to enable a predetermined amount of water to be channeled into a tub of the dishwasher. Each cycle of activating and deactivating the valve is referred to herein as a "fill cycle." A wash cycle may include a plurality of fill cycles. In at least some known dishwashers, such water valves are controlled by mechanical timers and/or system controllers that turn power to the valve on and off during a wash cycle.

Known mechanical timers activate the valve, count an amount of time, and deactivate the valve after a predetermined duration of time during each fill cycle. The mechanical timer and valve assembly may deliver an inaccurate amount of water to the tub due to variations in flow rate through the valve and variations in the accuracy of the mechanical timer. For example, the mechanical timer may activate for 60 seconds (sec) with a variation of at least +/−6 sec. In at least some known dishwashers, the variation in the accuracy of the mechanical timer can account for more than 50% of the variation in delivered water. As such, to ensure that at least the minimum amount of water is being delivered to the tub, the mechanical timer is configured to activate the valve for a slightly longer duration than a minimum duration to account for variations in flow rate and timer accuracy. Accordingly, extra water may be used during each on/off cycle of the valve, which increases water and/or energy consumption of the dishwasher. The extra water can be 10% or more of the minimum amount of water to for proper operation of the dishwasher.

When a known system controller is used to control the valve, the system controller generally provides on/off signals to the valve that are similar to the on/off signals provided by known mechanical timers. At least one known system controller receives feedback from a flowmeter associated with the valve to control an amount of water being delivered to the tub; however, the system controller includes extra input ports and programming to communicate with the flowmeter. As such, additional wires or lines are routed from the flowmeter through a cabinet of the dishwasher to the system controller, which adds complexity to the dishwasher and/or the system controller.

Further, when at least some known dishwashers are operated, extra water is delivered to the tub to wet components within the tub. For example, when a wash cycle is initiated, the tub, contents, racks, and/or a sump are dry. Once these surfaces are wetted and the sump is filled, less water can be used during subsequent fill cycles. However, known mechanical timers and at least some known system controllers perform the same fill cycle for the first fill cycle and for subsequent fill cycles. As such, extra water is being used during each subsequent fill cycle or an insufficient amount of water is being used during the first fill cycle.

BRIEF SUMMARY OF THE INVENTION

In one aspect, a valve assembly for use with a washing appliance having a main controller is provided. The valve assembly includes a valve that is moveable between a first position that prevents water from flowing through a supply line and a second position that allows water to flow through the supply line. A control assembly separate from the main controller is configured to control the valve to move between the first position and the second position. The control assembly includes a flow sensor configured to output a signal representing an amount of water flowing through the supply line and a control unit configured to control the valve assembly based on the output signal of the flow sensor.

In another aspect, a washing appliance is provided. The washing appliance includes a main controller, a tub, and a valve assembly. The valve assembly includes a valve that is moveable between a first position that prevents water from flowing through the supply line and a second position that allows water to flow through the supply line. The valve assembly further includes a flow sensor configured to output a signal representing an amount of water flowing through the supply line and a control unit coupled in communication with the main controller and configured to control the valve to move between the first position and the second position based on the output signal of the flow sensor.

In yet another aspect, a valve assembly for use with a washing appliance having a main controller is provided. The valve assembly includes a valve configured to couple in flow communication with a supply line. The valve is moveable between a first position that prevents water from flowing through the supply line and a second position that allows water to flow through the supply line. The valve assembly further includes a control assembly separate from the main controller and configured to control the valve to move between the first position and the second position. The control assembly includes a flow sensor configured to output a signal representing an amount of water flowing through the supply line, a control unit configured to control the valve assembly based on the output signal of the flow sensor, and a power supply configured to couple the control unit to the main controller.

BRIEF DESCRIPTION OF THE DRAWINGS

FIG. 1 is a partially broken-away side view of an exemplary washing appliance in a closed configuration.

FIG. 2 is a schematic view of an exemplary valve assembly that may be used with the washing appliance shown in FIG. 1.

FIG. 3 is a schematic view of an exemplary power supply that may be used with the valve assembly shown in FIG. 2.

FIG. 4 is a schematic view of an alternative valve assembly that may be used with the washing appliance shown in FIG. 1.

FIG. 5 is a flowchart of an exemplary method for manufacturing the washing appliance shown in FIGS. 1-4.

DETAILED DESCRIPTION OF THE INVENTION

Figure 1:
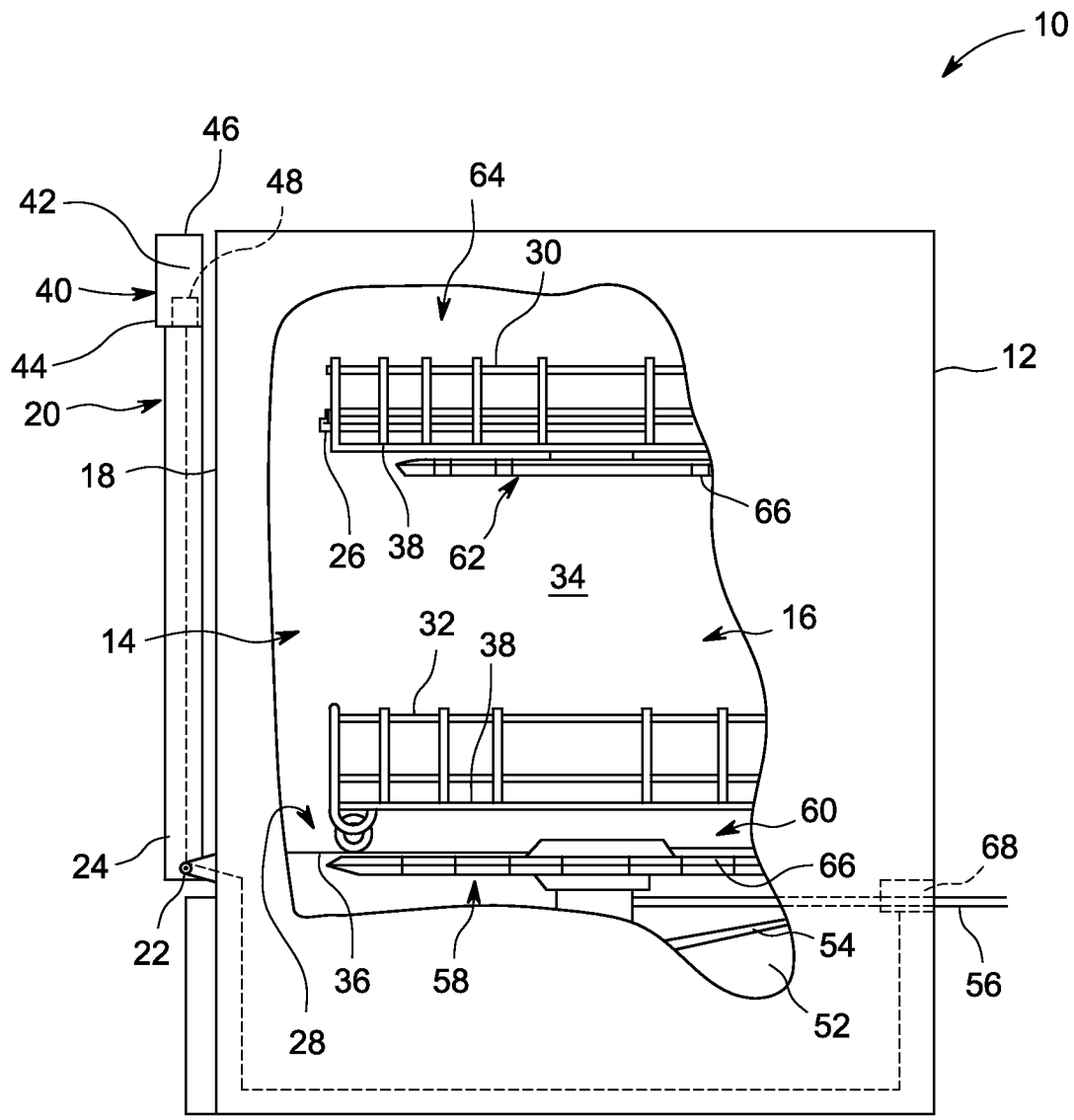
FIGS. 1-5 show exemplary embodiments of the systems and method described herein.

The embodiments described herein provide a valve assembly with built-in flow control. More specifically, the valve assembly includes an on-board control unit that enables the valve assembly to be self-regulating. The control unit initializes a valve of the valve assembly once the valve assembly is energized by a main controller of a washing appliance to perform a fill cycle. The control unit is configured to determine an amount of water flowing through the valve assembly, and close the valve after a predetermined amount of water has passed through the valve assembly. At an end of the fill cycle, the main controller deactivates the valve assembly. The control unit will repeat the process each time the valve assembly is energized by the main controller. Because the herein-described valve assembly includes a flow sensor and a control unit, the valve assembly delivers a fixed, very accurate quantity of water each time the valve assembly is energized.

Further, the embodiments described herein include a control assembly within the valve assembly and independent of the main controller. More specifically, when the valve assembly is powered, the control assembly only receives power from the main controller to energize the valve assembly, without receiving any other instructions and/or feedback from the main controller. As such, the valve assemblies described herein can function with any suitable main mechanical timer and/or main electronic control. Accordingly, the herein-described valve assemblies can be included within any suitable washing appliance without altering the main controller of the washing appliance.

Moreover, the valve assemblies described herein includes, in at least some embodiments, a temperature sensing device, such as a thermistor. The temperature sensing device is used by the control unit to add extra water to a wash chamber of the washing appliance during a first fill cycle. More specifically, when a wash cycle of the washing appliance, such as a dishwasher, is initiated, generally extra water will be required during the first fill because components within the wash chamber of the dishwasher are dry. For example, tub walls, dishes, and/or a sump can be dry. Once surfaces of these components are wetted and/or the sump is filled, extra water is no longer required to perform a fill cycle. As such, if the same amount of water is during each fill cycle, the first fill cycle may not include enough water and/or subsequent fill cycles may include extra water. Because most dishwashers are plumbed to hot water, components of the dishwasher and/or the valve assembly are hotter than prior to the first fill cycle. By measuring a temperature, the valve assemblies described herein can determine whether the first fill cycle or a subsequent fill cycle is being performed. Accordingly, more or less water can be supplied to the wash chamber according to which fill cycle is being performed.

The valve assemblies described herein each include a valve and a control assembly that includes the flow sensor and control unit. In one embodiment, the valve and the control assembly are included within the same common housing. In an alternative embodiment, the control assembly is housed separately from the valve.

FIG. 1 is a partially broken-away side view of an exemplary washing appliance 10 in a closed configuration. In the exemplary embodiment, washing appliance 10 is a dishwashing appliance. It should be understood that the methods and apparatus described herein can be practiced in other types of dishwashers and washing appliances beyond washing appliance 10. Accordingly, the embodiments described herein can be used with any suitable washing appliance that uses metered amounts of water flow for one or more wash cycles.

Washing appliance 10 includes a cabinet 12 having a tub 14 therein and forming a wash chamber 16. Tub 14 includes a front opening 18 and a door assembly 20 pivotally attached by a hinge 22 at a bottom 24. Door assembly 20 is moveable between a closed position (shown in FIG. 1) wherein wash chamber 16 is sealed shut for washing operation, and an open position for loading and unloading of contents of washing appliance 10. Upper rails 26 and lower rails 28 are mounted within tub 14. Upper rails 26 support an upper rack 30, and lower rails 28 support a lower rack 32. In the exemplary embodiment, upper rails 26 are coupled to side walls 34 of tub 14, and upper rack 30 is movable along upper rails 26. Lower rails 28 are coupled to and/or defined in side walls 34 and/or a bottom wall 36 of tub 14. Lower rack 32 is positioned on and/or in lower rails 28 for movement into and out of tub 14. In the exemplary embodiment, upper rack 30 and lower rack 32 are each fabricated from known materials into, for example, lattice structures, including a plurality of elongate members 38. Further, each rack 30 and 32 is movable between an extended loading position substantially outside of wash chamber 16, and a retracted position substantially inside of wash chamber 16. A silverware basket (not shown) can be removably attached to lower rack 32 for placement of silverware, utensils, and the like that are too small to be accommodated by upper rack 30 and/or lower rack 32.

A control panel 40 is integrated into an escutcheon 42 that is mounted to door assembly 20. Control panel 40 includes plurality of control selectors (not shown) and/or a control display (not shown) defined on a front face 44 of door assembly 20. Alternatively, or additionally, the selectors and/or the control display are defined at any suitable location on washing appliance 10, such as a top face 46 of door assembly 20. Control panel 40 and associated selectors and/or displays are communicatively coupled to a main controller 48 and control mechanisms (not shown) for operating a fluid circulation assembly, including, for example, spray arms, that circulates water and detergent within tub 14. In the exemplary embodiment, main controller 48 includes a mechanical timer 50 (shown in FIGS. 2 and 4). Alternatively, main controller 48 includes an electronic control rather than mechanical timer. In the exemplary embodiment, the fluid circulation assembly is located in a machinery compartment 52 located below a bottom sump portion 54 of tub 14. The construction and operation of the fluid circulation assembly is well within the purview of those in the art without detailed explanation, and further discussion of the fluid circulation assembly is therefore omitted. In the exemplary embodiment, a water supply line 56 is coupled in flow communication with tub 14 and/or the fluid circulation assembly. Water supply line 56 is a hot water line, although it should be understood that water supply line 56 may be any suitable water line that is configured to deliver water to washing appliance 10.

A lower spray assembly 58 is rotatably mounted within a lower region 60 of wash chamber 16 and above sump portion 54 so as to rotate in relatively close proximity to lower rack 32. A middle spray assembly 62 is located in an upper region 64 of wash chamber 16 and is located in close proximity to upper rack 30. In the exemplary embodiment, middle spray assembly 62 is located at a sufficient height above lower rack 32 to accommodate larger items, such as dishes or platters, that can be placed in lower rack 32 for washing by washing appliance 10. In an alternative embodiment, an upper spray arm assembly (not shown) is located above upper rack 30 at a sufficient height to enable a taller item, such as a glass, to be placed in upper rack 30. Lower spray assembly 58 and middle spray assembly 62 are supplied with fluid, such as water, by water supply line 56, and each spray assembly 58 and 62 includes an arrangement of discharge ports or orifices 66 for directing washing liquid onto items located in lower rack 32 and/or upper rack 30. An arrangement of discharge ports 66 in at least lower spray assembly 58 provides a rotational force by virtue of the fluid flowing through discharge ports 66. The resultant rotation of lower spray assembly 58 provides coverage of the dishwasher contents with a washing spray. In various alternative embodiments, middle spray assembly 62 and/or the upper spray assembly is also rotatably mounted and configured to generate a swirling spray pattern below and/or above upper rack 30 when the fluid circulation assembly is activated and door assembly 20 is properly closed to seal wash chamber 16 for operation.

Washing appliance 10 further includes a valve assembly 68 coupled along water supply line 56 upstream from tub 14 and/or spray assemblies 58 and/or 62. Valve assembly 68 is configured to allow and prevent water to flow through water supply line 56 to tub 14. In the exemplary embodiment, valve assembly 68 is configured to allow a predetermined amount of water to be delivered to tub 14 during a fill cycle, as described in more detail below.

Figure 2:
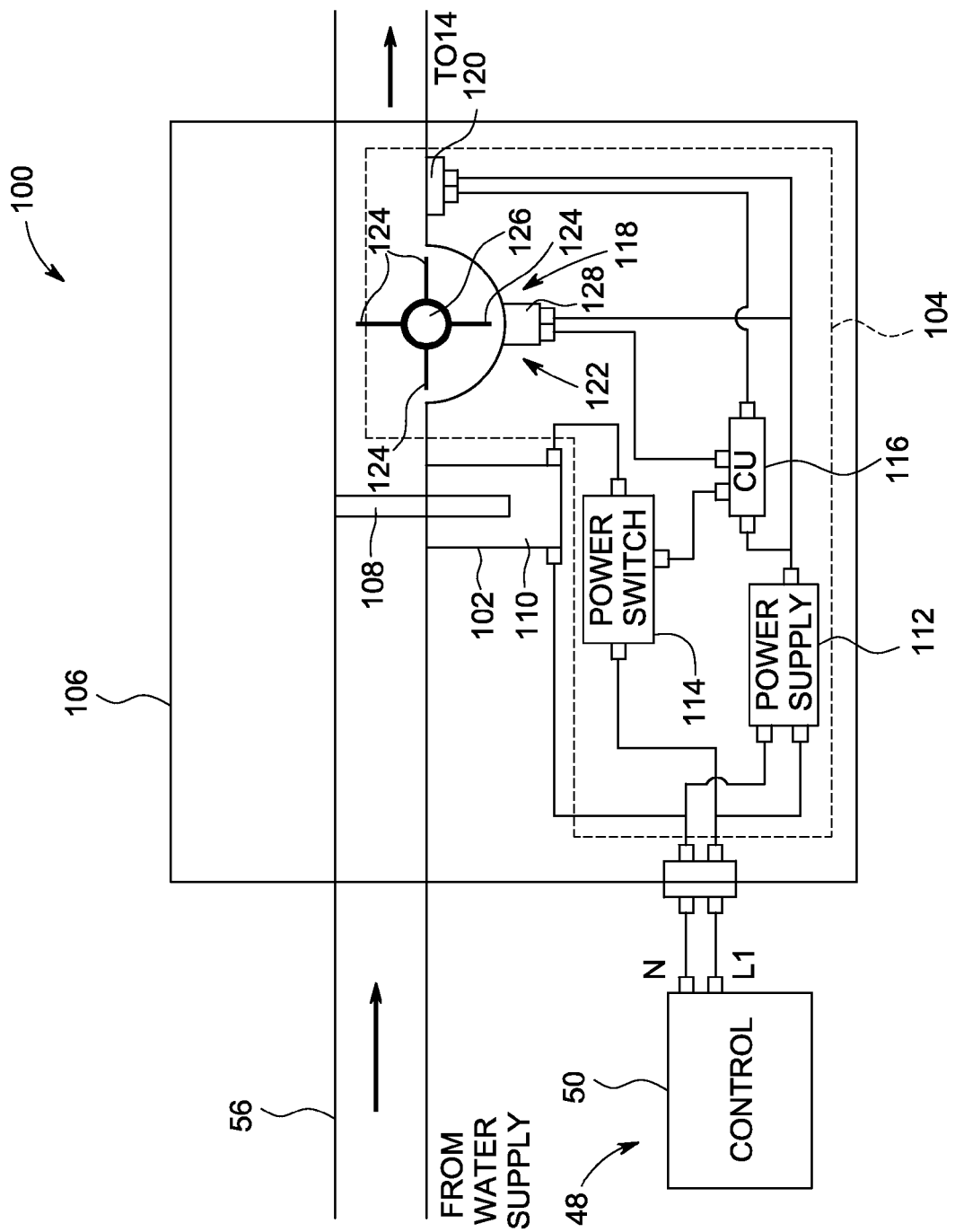

FIG. 2 is a schematic view of an exemplary valve assembly 100 used with washing appliance 10 (shown in FIG. 1). In the exemplary embodiment, valve assembly 100 is used as valve assembly 68 (shown in FIG. 1). Valve assembly 100 includes a valve 102 and a control assembly 104 communicatively coupled to valve 102. Control assembly 104 is communicatively coupled to mechanical timer 50 of main controller 48 for receiving power. When main controller 48 includes the electronic control, control assembly 104 is communicatively coupled to the electronic control. Valve 102 and control assembly 104 are positioned within a common housing 106.

Valve 102 is coupled to water supply line 56 and configured to prevent water from flowing through water supply line 56 to tub 14 and/or wash chamber 16 when in a closed configuration and to allow water to flow through water supply line 56 to tub 14 and/or wash chamber 16 when in an open configuration. Valve 102 is any suitable valve that enables valve assembly 100 to function as described herein. In the exemplary embodiment, valve 102 includes an armature 108 and a solenoid 110 that controls movement of armature 108. Armature 108 is moveable within water supply line 56 to prevent or allow a flow through water supply line 56. More specifically, solenoid 110 controls a position of armature 108 based on signals from control assembly 104. As shown in FIG. 2, valve 102 is the closed configuration in which armature 108 is in an extended position to facilitate preventing water from flowing through water supply line 56 to tub 14 and/or wash chamber 16. When armature 108 is in a retracted position (not shown), valve 102 is in the open configuration and water is allowed to flow to tub 14 and/or wash chamber 16 through water supply line 56. Alternatively, armature 108 of solenoid 110 opens a pilot valve (not shown), which then opens valve 102. As such, valve 102 is a direct acting valve or a pilot-operated valve. In an alternative embodiment, valve 102 includes a flow washer.

Control assembly 104 is configured to determine an amount of water supplied to tub 14 and/or wash chamber 16 and prevent more than a predetermined amount of water from being supplied to tub 14 and/or wash chamber 16. More specifically, control assembly 104 is configured to control the amount of water being supplied to tub 14 and/or wash chamber 16 only using power from main controller 48, as described in more detail below. Control assembly 104 does not receive any signals from main controller 48. In the exemplary embodiment, determination of the amount of water is made within control assembly 104 without processing in and/or feedback from main controller 48. As such, determination and quantity control are performed locally within valve assembly 100.

In the exemplary embodiment, control assembly 104 includes a power supply 112, a power switch 114, a control unit 116, a flow sensor 118, and a temperature sensor 120. Power supply 112 is communicatively coupled to main controller 48 for receiving power and communicatively coupled to power switch 114, control unit 116, flow sensor 118, and/or temperature sensor 120 for supplying power thereto. Power supply 112 is configured to reduce a voltage of power from main controller 48 to a voltage for use within valve assembly 100. For example, when main controller 48 supplies an alternating current (AC) mains, such as a 120 Volt (V) AC, signal to power supply 112, power supply 112 reduces the signal to a logic voltage, such as 5 V, to power components within control assembly 104.

Figure 3:
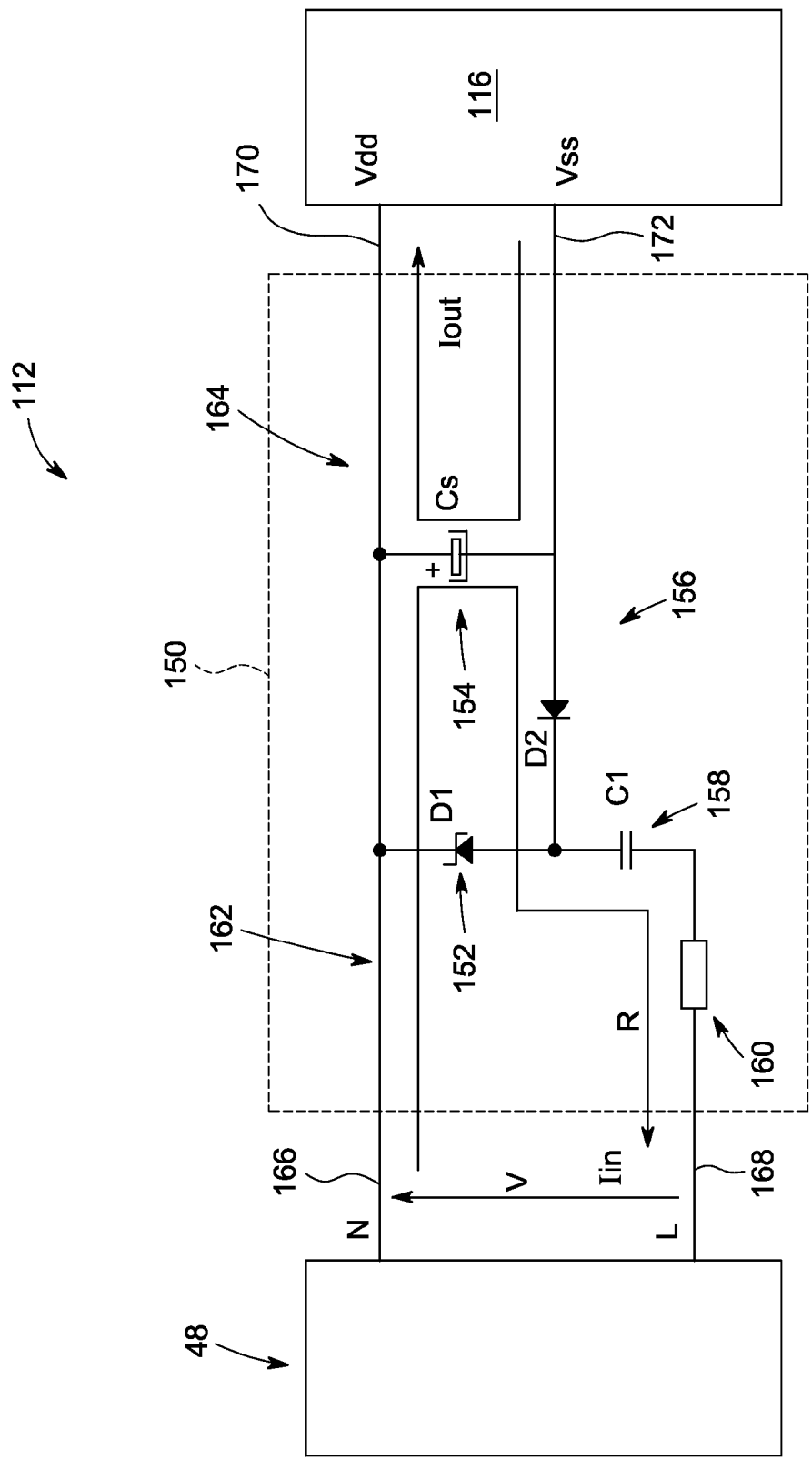

Cap-drop power supply 150, as shown in FIG. 3, includes a first diode 152, a first capacitor 154, a second diode 156, a second capacitor 158, and at least one resistor 160. First diode 152, second diode 156, second capacitor 158, and resistor 160 form an input circuit 162, and first capacitor 154 is included in input circuit 162 and an output circuit 164. Input circuit 162 is coupled to a neutral connection 166 and a line connection 168 to receive AC mains, such as 120 VAC, from main controller 48. Further, output circuit 164 is coupled to a voltage drain 170 and a voltage supply 172 for supplying about logic voltage, such as 5 V direct current (DC), to control unit 116. In the exemplary embodiment, first diode 152 is a zener diode configured to allow a current flow Iin through input circuit 162 to charge first capacitor 154 when neutral connection 166 is more positive than line connection 168. When neutral connection 166 is more negative than line connection 168, second diode 156 prevents current from discharging out of first capacitor 154 through input circuit 162. Further, when neutral connection 166 is more negative than line connection 168, first capacitor 154 discharges power to control unit 116 as current Iout. Second capacitor 158 and resistor 160 are configured to disperse voltage not used at output circuit 164. More specifically, second capacitor 158 and resistor 160 are configured to disperse voltage between first diode 152 and main controller 48. Although first diode 152 is described as including a zener diode, it should be understood that first diode 152 and/or second diode 156 can include one or more zener diodes.

Referring again to FIG. 2, power switch 114 is communicatively coupled main controller 48 to control power, for example, 120 VAC, to valve 102. Power switch 114 is further communicatively coupled to control unit 116, which transmits signals to power switch 114 to open and/or close power switch 114. More specifically, when power switch 114 is closed, current flows from main controller 48 to valve 102 for opening valve 102, i.e. moving armature 108 to the retracted position. When power switch 114 is open, current does not flow from main controller 48 to valve 102 for closing valve 102, i.e. moving armature 108 to the extended position.

Flow sensor 118 is coupled to water supply line 56 and includes, in the exemplary embodiment, a flowmeter 122. Flowmeter 122 is configured to rotate when water flows through water supply line 56 past flowmeter 122. More specifically, tips 124 of a rotor 126 are rotated past a sensor 128 as water flows past flowmeter 122. Tips 124 are spaced about rotor 126 such that every occurrence of a tip 124 moving across sensor 128 indicates that a predetermined amount of water has flowed through flowmeter 122. In one embodiment, a magnet (not shown) is positioned at at least one tip 124, and sensor 128 includes a hall sensor and/or a reed switch configured to detect the magnet. Flowmeter 122 outputs a pulsed signal indicating each occurrence of a tip 124 passing sensor 128. As such, by counting a number of occurrences of a tip 124 passing sensor 128 in the pulsed signal, control unit 116 can determine an amount of water passing through flowmeter 122. Although flowmeter 122 is described as having a "paddle wheel" configuration, it should be understood that flowmeter 122 can have a "turbine" configuration and/or any other suitable confirmation. In one embodiment, flow sensor 118 includes a flow washer and/or any other suitable sensor and/or components. Further, although flowmeter 122 is described as being positioned downstream from valve 102, it should be understood that flowmeter 122 can alternatively be positioned upstream from valve 102.

Temperature sensor 120 is coupled within valve assembly 100 to determine a temperature of at least one component within valve assembly 100 that contacts a flow of water through valve assembly 100. In the exemplary embodiment, temperature sensor 120 is positioned adjacent water supply line 56 downstream from valve 102 to determine a temperature of water supply line 56. Alternatively, temperature sensor 120 is coupled adjacent water supply line 56 upstream from valve 102, in valve 102, and/or in flow sensor 118. In the exemplary embodiment, temperature sensor 120 is a thermistor; however, temperature sensor 120 can be any suitable temperature sensor that enables valve assembly 100 to function as described herein.

In an alternative embodiment, temperature sensor 120 is positioned within washing appliance 10, such as within tub 14, and communicatively coupled to valve assembly 100. In such an embodiment, temperature sensor 120 is not positioned within common housing 106. In another alternative embodiment, temperature sensor 120 is omitted. In the exemplary embodiment, a temperature measured by temperature sensor 120 is used to determine whether washing appliance 10 has recently been used, which facilitates minimizing an amount of water used by washing appliance 10, as described in more detail below.

In the exemplary embodiment, control unit 116 includes, but is not limited to including, a microprocessor, a programmable logic device, a field programmable gate array, a mechanical timer, and/or any other suitable control unit. Control unit 116 is configured to supply a predetermined amount of water to tub 14 and/or wash chamber 16 based on a number of counts output by flowmeter 122 after valve assembly 100 receives power from main controller 48. Flowmeter 122 transmits a pulsed signal to control unit 116, and control unit 116 counts a number of pulses in the pulsed signal. When a predetermined number of pulses have been counted by control unit 116, control unit 116 closes valve 102 via power switch 114, thus ending a fill cycle. Control unit 116 restarts counting for each fill cycle performed by washing appliance 10. In a particular embodiment, control unit 116 counts two-hundred pulses and closes valve 102 during each fill cycle.

Further, in the exemplary embodiment, the predetermined number of pulses is determined based on a temperature measured by temperature sensor 120. More specifically, when the measured temperature is below a predetermined temperature threshold, a first predetermined number of pulses is counted by control unit 116 to supply a first predetermined amount of water. Similarly, when the measured temperature is above the predetermined temperature threshold, a second predetermined number of pulses is counted by control unit 116 to supply a second predetermined amount of water. The second predetermined number of pulses is less than the first predetermined number of pulses to supply less water when the measured temperature is above the temperature threshold. In a particular embodiment, the first predetermined number of pulses is two-hundred, and the second predetermined number of pulses is one-hundred-eighty. Accordingly, in the exemplary embodiment, the first fill will supply more water to tub 14 and/or wash chamber 16 than subsequent fills because the measured temperature for the first fill will be lower than the temperature threshold. The first fill will warm the components of valve assembly 100 such that the measured temperature for subsequent fills will be higher than the temperature threshold. In a particular embodiment, the temperature threshold is set at a temperature that is usually above room temperature. For example, the temperature threshold is set at or above about 90 degrees Fahrenheit (° F.).

Referring to FIGS. 1 and 2, during operation of washing appliance 10, the user initiates a wash cycle using control panel 40. Main controller 48 powers valve assembly 100 to initiate a fill cycle of the washing cycle. Valve assembly 100 initializes power supply 112, power switch 114, and valve 102 upon receiving power. Power supply 112 then initializes control unit 116, flow sensor 118, and temperature sensor 120. Temperature sensor 120 transmits a measured temperature to control unit 116, and control unit 116 determines a quantity of water to supply during the fill cycle based on the measured temperature, as described above. A predetermined number of counts is associated with the determined quantity of water. When temperature sensor 120 is omitted, control unit 116 supplies the same amount of water during each fill cycle of the washing cycle. In the exemplary embodiment, control unit 116 transmits a signal to power switch 114 to open valve 102. After valve 102 is opened, water flows through valve assembly 100 via water supply line 56.

As the water flows past flowmeter 122, the water applies a force to tips 124, which causes rotor 126 to rotate. As rotor 126 rotates, tips 124 move past sensor 128 to generate a pulsed signal. The pulsed signal is transmitted from flowmeter 122 to control unit 116. Control unit 116 counts a number of pulses in the pulsed signal, and ends the signal to power switch 114 when the predetermined number of counts has been counted. When the signal from control unit 116 to power switch 114 is discontinued, valve 102 closes to prevent the water from flowing through valve assembly 100. Since main controller 48 fills tub 14 (shown in FIG. 1) based on time, main controller 48 is remove power to valve assembly 100 after an predetermined amount of time has passed, which deactivates power supply 112, power switch 114, and valve 102. As such, control unit 116, flow sensor 118, and temperature sensor 120 are also deactivated. When main controller 48 determines that a subsequent fill cycle is to begin, main controller 48 powers valve assembly 100, which repeats the above-described process. In the exemplary embodiment, valve assembly 100 fills tub 14 faster than conventional valve assemblies to ensure that valve assembly 100 has performed its fill cycle before main controller 48 removes power to valve assembly 100.

Figure 4:
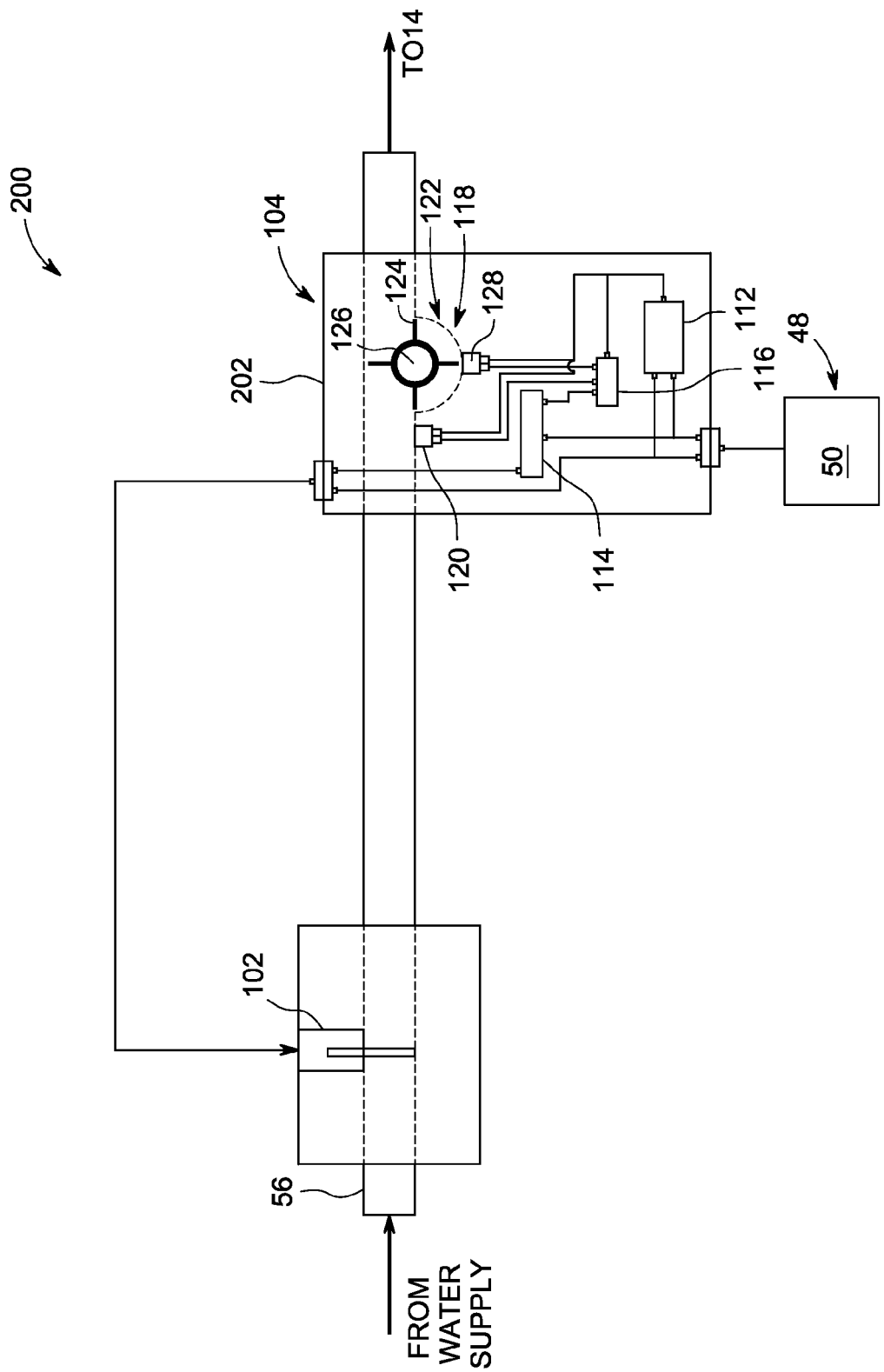

FIG. 4 is a schematic view of an alternative valve assembly 200 that may be used with washing appliance 10 (shown in FIG. 1). In the exemplary embodiment, valve assembly 200 is used as valve assembly 68 (shown in FIG. 1). Valve assembly 200 is substantially similar to valve assembly 100 (shown in FIG. 2), except at least valve 102 is positioned outside of a housing 202 that includes other components of valve assembly 200, rather being positioned within common housing 106 (shown in FIG. 2). As such, components shown in FIG. 4 are labeled with the same reference numbers used in FIG. 2.

In the exemplary embodiment, flow sensor 118 and control unit 116 are positioned within housing 202 separate from main controller 48 of washing appliance 10, and valve 102 is positioned outside of housing 202. More specifically, valve assembly 200 includes valve 102 and housing 202 positioned in series along water supply line 56 and communicatively coupled to each other. Although valve 102 is shown positioned upstream from housing 202, it should be understood that housing 202 can be positioned upstream from valve 102. In the exemplary embodiment, housing 202 includes control assembly 104. More specifically, housing 202 includes power supply 112, such as cap-drop power supply 150 shown in FIG. 3, power switch 114, control unit 116, flow sensor 118, and temperature sensor 120. Alternatively, temperature sensor 120 is positioned within valve 102, along water supply line 56 outside of valve 102 and second housing 202, and/or within tub 14 (shown in FIG. 1). In an alternative embodiment, temperature sensor 120 is omitted. In the exemplary embodiment, housing 202 is communicatively coupled to main controller 48 and coupled in flow communication with water supply line 56. Components of valve 102 and housing 202 are configured and function similarly to like components described with respect to FIG. 2. By positioning valve 102 separately from control assembly 104, valve 102 and control assembly 104 can have different suppliers and/or control assembly 104 can be retrofit to function with any suitable valve.

Referring to FIGS. 1 and 4, during operation of washing appliance 10, the user initiates a wash cycle using control panel 40. Main controller 48 powers housing 202 of valve assembly 200 to initiate a fill cycle of the washing cycle. Valve assembly 200 initializes power supply 112 and power switch 114 within housing 202 and valve 102 upon being powered by main controller 48. Power supply 112 then initializes control unit 116, flow sensor 118, and temperature sensor 120. Temperature sensor 120 transmits a measured temperature to control unit 116, and control unit 116 determines a quantity of water to supply during the fill cycle based on the measured temperature, as described above. A predetermined number of counts is associated with the determined quantity of water. When temperature sensor 120 is omitted, control unit 116 supplies the same amount of water during each fill cycle of the washing cycle. In the exemplary embodiment, control unit 116 transmits a signal to power switch 114, which transmits a signal to valve 102 to open valve 102. After valve 102 is opened, water flows through valve 102 and housing 202 of valve assembly 200 via water supply line 56.

As the water flows past flowmeter 122, the water applies a force to tips 124, which causes rotor 126 to rotate. As rotor 126 rotates, tips 124 move past sensor 128 to generate a pulsed signal. The pulsed signal is transmitted from flowmeter 122 to control unit 116. Control unit 116 counts a number of pulses in the pulsed signal, and ends the signal to power switch 114 when the predetermined number of counts has been counted. When the signal from control unit 116 to power switch 114 is discontinued, the signal from power switch 114 to valve 102 is discontinued. As such, valve 102 closes to prevent the water from flowing through valve assembly 200. Main controller 48 then removes power to valve assembly 200, which deactivates power supply 112, power switch 114, and valve 102. As such, control unit 116, flow sensor 118, and temperature sensor 120 are also deactivated. When main controller 48 determines that a subsequent fill cycle is to begin, main controller 48 powers valve assembly 200, which repeats the above-described process.

Figure 5:
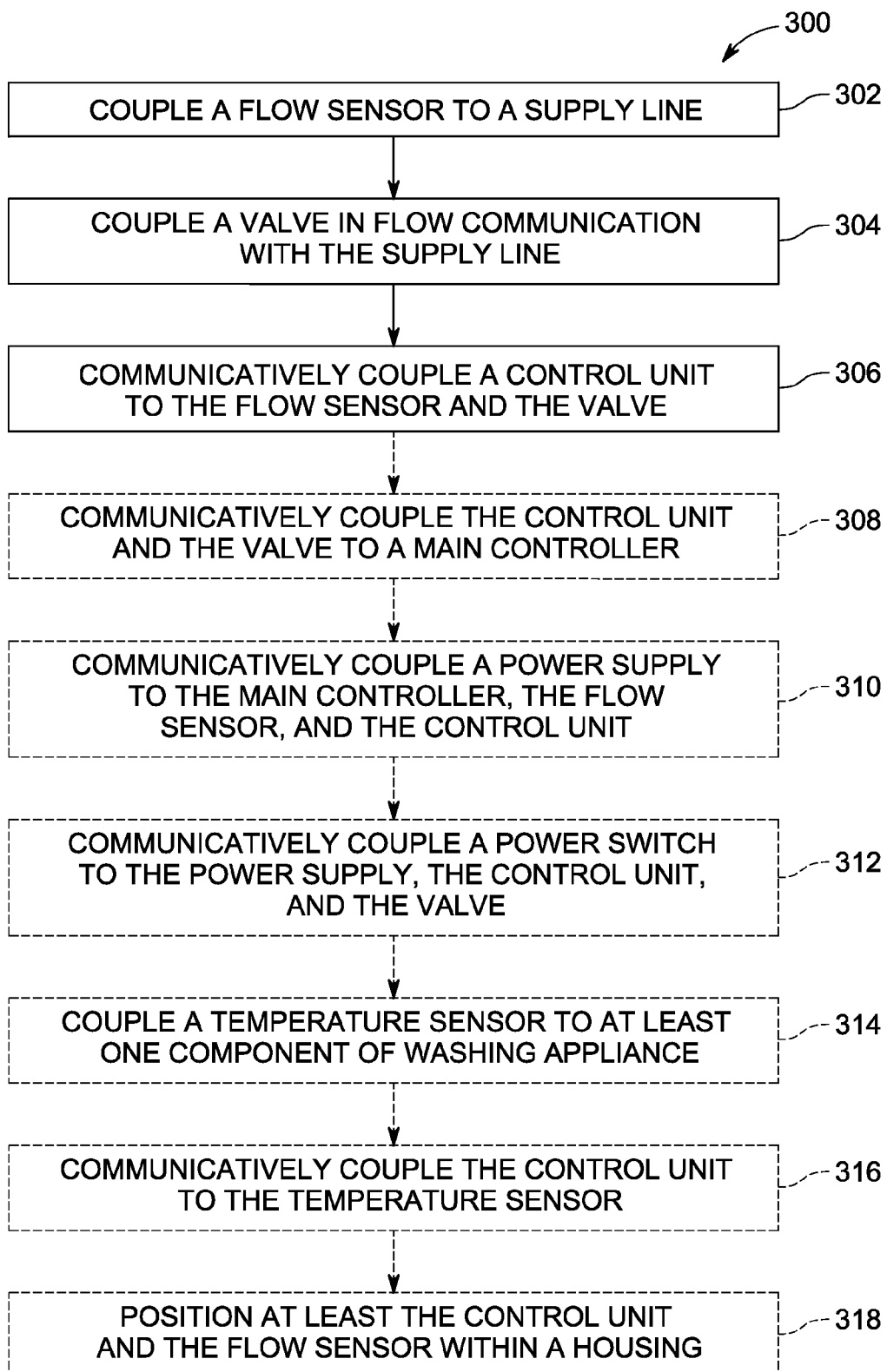

FIG. 5 is a flowchart of an exemplary method 300 for manufacturing washing appliance 10 (shown in FIGS. 1-4). Referring to FIGS. 1-5, method 300 includes coupling 302 flow sensor 118 to supply line 56 and coupling 304 valve 102 in flow communication with supply line 56. Control unit 116 is communicatively coupled 306 to flow sensor 118 and valve 102. Control unit 116 is also communicatively coupled 308 to main controller 48.

Within valve assembly 100 and/or 200, power supply 112 is communicatively coupled 310 to main controller 48, flow sensor 118, and control unit 116. Power supply 112 is configured to receive power from main controller 48 for powering control unit 116, valve 102, and flow sensor 118. Further, power switch 114 is communicatively coupled 312 to power supply 112, control unit 116, and valve 102. In the exemplary embodiment, temperature sensor 120 is coupled 314 to at least one component of washing appliance 10. For example, temperature sensor 120 is coupled 314 to supply line 56, valve 102, flow sensor 118, and/or tub 14. In an alternatively embodiment, temperature sensor 120 is omitted. In the exemplary embodiment, temperature sensor 120 is configured to measure a temperature of the component to which temperature sensor 120 is coupled 314. Further, control unit 116 is communicatively coupled 316 to temperature sensor 120 such that control unit 116 controls valve 102 based on the measured temperature of the component.

Method 300 further includes positioning 318 at least control unit 116 and flow sensor 118 within housing 106 or 202. In the exemplary embodiment, valve 102, flow sensor 118, and control unit 116 are positioned 318 within common housing 106. Alternatively, flow sensor 118 and control unit 116 are positioned 318 in housing 202, and valve 102 is positioned 318 outside of housing 202.

The above-described embodiments provide "smart" valve assemblies that include an on-board control unit and flow sensor. More specifically, upon a main controller energizing the valve assembly, the valve assembly itself will provide a fixed quantity of water to a washing appliance without feedback from the main controller. Accordingly, the valve assemblies described herein more accurately supply water to a washing appliance, as compared to washing appliances that includes valves controlled by the main controller. Because of the higher accuracy, the valve assemblies described herein supply less water per fill cycle to the washing appliance, as compared to washing appliances that includes higher variation in water delivery. Accordingly, water consumption in washing appliances having mechanical timers or simple electronic controls can be reduced by using the valve assemblies described herein, without undertaking a significant amount of cost associated with a system redesign. Further, by including the above-described temperature sensor, the valve assemblies described herein can further reduce the amount of water consumed during a wash cycle by only supplying extra water during a first fill cycle.

Moreover, the embodiments described herein provide a valve assembly having its components houses within a common housing. By using the common housing, a manufacturer does not need to modify any other components and/or make additional electrical connections within the washing appliance. Rather, the above-described common-housing valve assembly is assembled within washing appliance in place of a conventional valve. As such, there is no increase in the amount of labor needed to assemble the washing appliance, which also prevents the cost of the washing appliance from increasing as efficiency improves. Alternatively, the valve assembly can include a control assembly housed separately from a valve. As such, the valve and the control assembly can be sourced from two different suppliers and/or the control assembly can be retrofit to any suitable valve.

Additionally, the cap-drop power supply described herein is less expensive and smaller, as compared to conventional power supplies that include a transformer and voltage regulator and/or a buck-type switch-mode power supply found in power adaptors. More specifically, above-described the cap-drop power supply can be used on-board the valve assembly because it is smaller than traditional power supplies.

A technical effect of the apparatus and methods described herein includes at least one of: (a) initializing components of a valve assembly upon receiving power from a main controller; (b) determining a quantity of water to supply during a fill cycle based on a measured temperature of at least one component within the valve assembly and/or washing appliance; (c) transmitting a pulsed signal from a flow sensor to a control unit that counts a number of pulses in the pulsed signal; and (d) closing a valve when a predetermined number of counts has been counted.

Exemplary embodiments of a valve assembly for use with a washing appliance and method for making the same are described above in detail. The apparatus and method are not limited to the specific embodiments described herein, but rather, components of systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly for use with a washing appliance comprising a tub to receive only hot water and a main controller, said valve assembly comprising:
    a direct acting two-way hot water valve moveable between a first position that prevents hot water from flowing through a supply line and a second position that allows hot water to flow through the supply line to the tub; and
    a control assembly configured to control said direct acting two way hot water valve to move between the first position and the second position to deliver a volume of hot water per fill cycle, said control assembly comprising:
        a flow sensor configured to output a signal representing an amount of hot water flowing through the supply line;
        a temperature sensor configured to measure a supply hot water temperature to the appliance; and,
        a control unit configured to control said direct acting two way hot water valve to deliver a decreased volume of hot water per fill cycle if the measured supply hot water temperature is above a threshold temperature.

2. A valve assembly in accordance with claim 1, wherein said valve, said flow sensor, and said control unit are positioned within a common housing separate from the main controller of the washing appliance.

3. A valve assembly in accordance with claim 1, wherein said flow sensor and said control unit are positioned within a housing separate from the main controller of the washing appliance, said valve positioned outside of the housing.

4. A valve assembly in accordance with claim 1, wherein said control assembly further comprises:
    a power supply configured to receive power from the main controller of the washing appliance; and
    a power switch communicatively coupled to said power supply, said control unit, and said valve, wherein said power switch is configured to supply power to said valve from said power supply based on a signal from said control unit.

5. A valve assembly in accordance with claim 1, wherein said flow sensor comprises a flowmeter configured to output a pulsed signal to said control unit, wherein the pulsed signal is indicative of an amount of hot water flowing through said flowmeter, and wherein said control unit is configured to move said direct acting two way hot water valve to the first position after said control unit counts a pre-determined number of pulses in the pulsed signal.

6. A washing appliance, comprising:
    a main controller;
    a tub to receive only hot water; and
    a valve assembly comprising:
        a direct acting two way hot water valve moveable between a first position that prevents hot water from flowing through a supply line and a second position that allows hot water to flow through the supply line to said tub;
        a flow sensor configured to output a signal representing an amount of hot water flowing through the supply line;
        a temperature sensor configured to measure a supply hot water temperature to the appliance; and
        a control unit configured to control said direct acting two way hot water valve to move between the first position and the second position to deliver a volume of hot water per fill cycle, the control unit configured to control said direct acting two way hot water valve to deliver a decreased volume of hot water per fill cycle if the measured supply hot water temperature is above a threshold temperature.

7. A washing appliance in accordance with claim 6, wherein said control unit is positioned remotely from said main controller.

8. A washing appliance in accordance with claim 6, wherein, said valve, said flow sensor, and said control unit are positioned within a common housing separate from said main controller.

9. A washing appliance in accordance with claim 6, wherein said flow sensor and said control unit are positioned within a housing separate from said main controller, said valve positioned outside of the housing.

10. A washing appliance in accordance with claim 6, wherein said flow sensor comprises a flowmeter configured to output a pulsed signal to said control unit, wherein the pulsed signal is indicative of an amount of hot water flowing through said flowmeter, and wherein said control unit is configured to move said valve to the first position after said control unit counts a pre-determined number of pulses in the pulsed signal.

11. A valve assembly for use with a washing appliance comprising a main controller, said valve assembly comprising:
    a direct acting two way valve configured to couple in flow communication with only a hot water supply line, said valve moveable between a first position that prevents hot water from flowing through the supply line and a second position that allows hot water to flow through the supply line; and
    a control assembly separate from the main controller and configured to control said direct acting two way valve to move between the first position and the second position to deliver a volume of hot water per fill cycle, said control assembly comprising:

a flow sensor configured to output a signal representing an amount of hot water flowing through the supply line;

a power supply configured to couple said control unit to the main controller;

a temperature sensor configured to measure a supply hot water temperature to the appliance; and a control unit configured to control said direct acting two way valve to deliver a decreased volume of hot water per fill cycle if the measured supply hot water temperature is above a threshold temperature.

12. A valve assembly in accordance with claim 11, wherein said power supply is configured to receive alternating current mains from the main controller and supply logic voltage to said control unit.

13. A valve assembly in accordance with claim 11, wherein said power supply comprises:

an input circuit including a first diode, a second diode, a first capacitor, a second capacitor, and at least one resistor; and an output circuit coupled to said input circuit and including said first capacitor, wherein said input circuit is configured to charge said first capacitor and said output circuit is configured to discharge said first capacitor.

* * * * *